Patented Jan. 18, 1944

2,339,335

UNITED STATES PATENT OFFICE 2,339,335

PROTECTION OF SEEDS AGAINST BIRDS

Franz Heckmanns, Leverkusen-Wiesdorf, and Marianne Meisenheimer, Leverkusen-Kuppersteg, Germany, assignors to Winthrop Chemical Company, Inc., New York, N. Y., a corporation of New York No Drawing. Application July 29, 1941, Serial No. 404,524. In Germany June 19, 1940

6 Claims. (Cl. 167—38)

This invention relates to the protection of seeds to prevent them from being devoured by birds, to the treatment of seeds whereby they are made unattractive to birds and to compositions suitable for this purpose.

It has often been attempted to protect seeds from being eaten by birds such as crows, sparrows or pheasants by treating the seed grain. The object was to act upon the senses of sight, smell or taste of the birds by treating the seeds with dyestuffs or ill-smelling or -tasting matters. For this purpose dyestuffs, such as Prussian-blue or red-iron oxides as well as carbon-black, have been used to color the grain. Tarry products and tarsoaps which contain ill-tasting and ill-smelling substances, such as pyridine, were employed to keep the crows away from the seeds. By the simultaneous application of several substances, each displaying a different action, it was sought to increase the efficacy of such treatment. In most cases, however, these experiments had no practical success since the preparations caused injuries to the seeds, they were not efficacious enough or their price was prohibitive. Only liquid tarry products have been recognized by the art and are to be found on the market. Their use necessitates, however, a cumbersome treatment and subsequent drying of the seed grain. It is to be regarded as a special disadvantage of these preparations that in many cases they cause delay in the germination of the seeds. Solid mixtures of tar or liquid tarry products with solid fillers did not prove suitable for the purpose in question.

Now we have found that by a treatment with an anthraquinone or benzanthrone seeds are made unattractive to birds. The term "an anthraquinone" whenever used in the description or the claims comprises not only anthraquinone of the formula

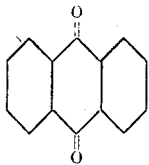

(1)

but also dithioanthraquinone

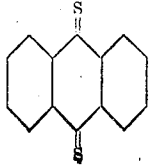

(2)

as well as their substitution products. The said anthraquinones may for instance bear alkyl, aryl, amino or sulfonic acid or carboxylic acid groups as well as halogen atoms as substituents of the nuclei. Suitable anthraquinones are for instance chlorinated or brominated anthraquinones, anthraquinone sulfonic acids or their salts and aminoanthraquinones. The anthraquinone may contain one or more substituents. As a rule anthraquinone (1) and its derivatives are more effective than dithioanthraquinone (2) and its derivatives. Furthermore, water-insoluble compounds of these series have proved to be more efficacious than water-soluble substances.

If the pure substances are employed they are preferably applied to the seed grain in conjunction with a solid filler or a liquid solvent. Generally preparations containing about 25% of the said compounds are efficacious in concentrations of 2-4:1000. The said substances may be admixed with solid inert fillers such as talc, chalk, diatomaceous earth, pulverized brown-coal, slate flour, wood flour, gypsum, kieselguhr, bleaching earths, sodium carbonate or sodium bicarbonate.

The seed grain is then treated with these powders in the usual manner. The filler or diluent, too, may also exert a frightening action on the birds; red or black-iron oxide, iron hydroxide or carbon black may thus be used wholly or partially as a filler. The said compounds may also be applied to the seed grains in a liquid medium by spraying the seeds with such preparations or dipping the seeds therein. As liquid diluent water is especially suited. Such aqueous solutions may contain a wetting or dispersing agent. The seed grain may, however, also be treated with solutions of the said compounds in suitable organic solvents or oils.

The use of an inert solid filler is in general not necessary if instead of the pure compounds the residues obtained in the course of their preparation and purification are employed. The concentrations in which these residues are applied to the seed grain depend on the amount of anthraquinone contained therein.

The efficacy of the said compounds against attack by fungi is insufficient. If it is intended to combine the protectitn of the seeds against birds with the protection against fungi it is necessary to add suitable fungicides, such as alkoxyalkylmercuri compounds or aromatic mercuri compounds. Also substances influencing the growth of plants such as phytohormones, for instance β-indolylacetic, their homologues, for instance β-indolylpropionic acid or β-indolyl butyric acid or salts or esters of these acids may simultaneously be added.

It is understood that mixtures of two or more anthraquinones may be used for the purpose of the invention.

Quinones, quinonimides or phenanthrenequinones have already been suggested as seed dressing agents. Nothing is, however, known about the possibility that these compounds may render seeds unattractive to birds.

The following examples illustrate the invention without, however, restricting it thereto:

Example 1

100 grs. of wheat were treated with a mixture of 25% anthraquinone and 75% talc and another portion of 100 grs. of wheat was treated with talc only. In both cases the proportion was 2:1000. The grains were set before crows in 2 shallow trays. The next day all the grains treated with talc had been eaten whereas 97.5 g. of uneaten grains treated with anthraquinone could be collected. All the seed grains had absolutely the same appearance.

Example 2

Wheat was dusted with the substances or mixtures mentioned in the following table. Then it was buried in the soil. The place where the treated and (for control purposes) the untreated seeds had been sown—was surrounded by a cage. After having germinated the seeds were placed in a position freely accessible to crows. The untreated seeds were generally eaten, whereas the treated seeds were not devoured in several experiments.

The following quantities were effective:

| | |
|---|---|
| 1-aminoanthraquinone | 4:1000 |
| 1,8-dichloro-anthraquinone | 4:1000 |
| 1-chloro-anthraquinone | 4:1000 |
| 1-chloro-anthraquinone | 2:1000 |
| Benzanthrone | 4:1000 |
| Benzanthrone | 2:1000 |
| Anthraquinone | 2:1000 |
| Anthraquinone, 50%:50% talcum | 2:1000 |
| Anthraquinone, 25%:75% talcum | 2:1000 |
| Residue obtained in the preparation of anthraquinone | 4:1000 |
| Residue obtained in the preparation of calcium anthraquinone - 1,5 - disulphonate | 4:1000 |
| Residue obtained in preparation of dithioanthraquinone | 8–10:1000 |

All the preparations caused no delay in the germination of the seeds.

We claim:

1. A process for treating seeds to render them unattractive to birds, which comprises applying an anthraquinone to such seeds.

2. A process for treating seeds to render them unattractive to birds, which comprises applying a chlorinated anthraquinone to such seeds.

3. A process for treating seeds to render them unattractive to birds, which comprises applying 1-chloro-anthraquinone to such seeds.

4. A process for treating seeds to protect them against birds, which comprises applying to such seeds unsubstituted anthraquinone of the formula

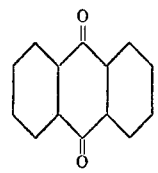

5. A process for protecting seeds against birds, which comprises applying benzanthrone to such seeds.

6. A process for protecting seeds against birds, which comprises applying to such seeds a quinone selected from the group consisting of anthraquinones and benzanthrone.

FRANZ HECKMANNS.
MARIANNE MEISENHEIMER.